United States Patent [19]

Beall et al.

[11] Patent Number: 4,582,760
[45] Date of Patent: Apr. 15, 1986

[54] GLAZES FOR GLASS-CERAMIC ARTICLES

[75] Inventors: George H. Beall, Big Flats; Paul S. Danielson; John E. Megles, Jr., both of Corning; Walter H. Tarcza, Painted Post, all of N.Y.

[73] Assignee: Corning Glass Works, Corning, N.Y.

[21] Appl. No.: 735,660

[22] Filed: May 20, 1985

[51] Int. Cl.$^4$ .................. C03C 8/12; C03C 3/118; C03C 3/108; B32B 17/06
[52] U.S. Cl. .................. 428/428; 501/23; 501/59; 501/61
[58] Field of Search .................. 501/23, 61, 59; 428/428

[56] References Cited

U.S. PATENT DOCUMENTS

| | | | |
|---|---|---|---|
| 3,201,266 | 8/1965 | MacDowell | 501/8 |
| 3,384,508 | 5/1968 | Bopp et al. | 501/61 |
| 3,498,804 | 3/1970 | Head, Jr. | 501/61 |
| 4,331,768 | 5/1982 | Boyd et al. | 501/22 |
| 4,467,039 | 8/1984 | Beall et al. | 501/3 |

FOREIGN PATENT DOCUMENTS 477947 8/1975 U.S.S.R. .................. 501/61

Primary Examiner—Mark L. Bell
Attorney, Agent, or Firm—C. S. Janes

[57] ABSTRACT

The present invention is concerned with the preparation of glazes which are especially suitable for application to glass-ceramic articles containing potassium fluorrichterite as substantially the sole crystal phase. The glazes consist essentially, expressed in terms of weight percent on the oxide basis, of $SiO_2$:46–50
$Al_2O_3$:5–8
$ZrO_2$:0.3–1
$Li_2O$:1–2
$Na_2O$:2–3.5
$K_2O$:1–2
CaO:1–4
ZnO:2–6
SrO:2–6
$B_2O_3$:9–11
PbO:20–25.

4 Claims, No Drawings

GLAZES FOR GLASS-CERAMIC ARTICLES

BACKGROUND OF THE INVENTION

As is well-recognized in the art, glass-ceramic bodies are prepared through the heat treatment of precursor glass bodies. Thus, the method for producing glass-ceramic articles contemplates three general steps: first, a batch for a glass of a particular composition is melted; second, that melt is cooled to a temperature below the transformation range thereof and, simultaneously, a glass body of a desired geometry is shaped therefrom; and, third, that glass body is exposed to temperatures above the transformation range in a controlled manner to cause crystallization in situ of the glass. Often, the third step will comprise a two-stage heat treatment in which the parent glass body is initially heated to a temperature within or somewhat above the transformation range for a sufficient length of time to generate nuclei; and thereafter the tempreature is raised, frequently above the softening point of the glass, to cause the growth of crystals on the nuclei. This two-stage heat treatment yields glass-ceramic bodies which typically are more highly crystalline and the crystals more uniformly fine-grained. Because the growth of crystals takes place in situ, glass-ceramic bodies are non-porous and free from voids.

Inasmuch as glass-ceramic articles are normally highly crystalline, i.e., at least 50% by volume crystalline, they are usually mechanically stronger than the parent glass bodies from which they are derived. For example, whereas annealed glass articles customarily demonstrate moduli of rupture over the range of about 5000–10,000 psi, glass-ceramic articles frequently exhibit moduli of rupture varying over the interval of about 10,000–20,000 psi.

Although a glass-ceramic article often displays a modulus of rupture twice that of its parent glass, considerable effort has been expended over the years to significantly enhance the mechanical strengths of glass-ceramic articles. Furthermore, whereas glass-ceramic articles often manifest smooth, glass-like surfaces, there has been the desire, especially where the articles will be used as tableware, to apply decorations thereto. Also, in certain instances it has been found desirable/necessary to protect the surface of glass-ceramic articles from attack by chemical agents.

One means for accomplishing those three objectives has involved the use of glazes or enamels. Glazes are generally deemed to be clear glasses; colored glazes are considered to be clear glasses with colorants dissolved therein; and enamels are defined as glazes having pigments suspended therein to impart color and/or opacity thereto. Both glazes and enamels are customarily applied to the surface of a glass-ceramic article in the form of very finely-divided particles or powder, termed by the art "frit", suspended in a volatile vehicle to yield a paste or slurry. The frit is subsequently fired to first remove the vehicle and thereafter at a higher temperature to fuse the particles together to form a strongly-adherent, continuous film on the surface of the article.

A frit must demonstrate two fundamental characteristics to be operable as a glaze or enamel for a particular glass-ceramic substrate: (a) the firing or maturing temperature thereof, i.e., the temperature at which the frit will flow sufficiently to produce a smooth uniform coating on the glass-ceramic, must be low enough to avoid thermal deformation of the glass-ceramic article being coated; and (b) the coefficient of thermal expansion thereof must be compatible with that of the glass-ceramic to inhibit crazing and/or spalling of the coating. Preferably, the coefficient of thermal expansion of the frit will be somewhat lower than that of the glass-ceramic such that the resultant coating is placed under compressive stress which, in turn, enhances the overall mechanical strength of the final product.

As can be appreciated, the sale of products designed for use as tableware is strongly influenced by the visual appearance thereof. Therefore, the use of enamels and glazes to alter and/or improve the aesthetic qualities of such products has been extensive. Moreover, the use of certain enamels and glazes has preserved the attractive surface finishes developed by inhibiting food staining and chemical attack from such items as foods, detergents, and other cleaning agents.

The use of glass-ceramic bodies in tableware applications had its genesis in U.S. Pat. No. 3,201,266. That patent disclosed glass-ceramic articles in the $Na_2O$—$BaO$—$Al_2O_3$—$SiO_2$—$TiO_2$ composition containing crystals of nepheline and celsian or hexacelsian. Those articles exhibited coefficients of thermal expansion ranging between about $75$–$110 \times 10^{-7}/°C$.

U.S. Pat. No. 3,384,508 describes glazes especially designed for use with glass-ceramic bodies containing nepheline as a primary crystal phase. Those glazes consisted essentially, in weight percent on the oxide basis, of:

$Na_2O$: 1.5–16
$K_2O$: 0–8
$Na_2O$—$K_2O$: 1.5–16
$Al_2O_3$: 3–10
$B_2O_3$: 4–19
$SiO_2$: 40–70
$MgO$: 0–9
$CaO$: 0–12
$PbO$: 0–40
$ZrO_2$: 0–5
$CdO$: 0–5
$CaF_2$: 0–8.5
$ZnO$: 0–2.

Those glazes were operable with the glass-ceramics of U.S. Pat. No. 3,201,266 and reacted with the surface of the glass-ceramic body to form an intermediate layer between the glass-ceramic and the glaze consisting of crystals extending into the glaze and interlocking therewith.

Recently, glass-ceramic bodies have been developed which not only exhibit moduli of rupture in excess of 20,000 psi but also demonstrate high intrinsic toughness against fracture propagation, thereby rendering them especially suitable for the production of tableware. As disclosed in U.S. Pat. No. 4,467,039, those glass-ceramics contain potassium fluorrichterite as the predominant crystal phase and consist essentially, in weight percent on the oxide basis, of:

$SiO_2$: 50–70
$CaO$: 4–15
$MgO$: 8–25
$F$: 3–8
$Na_2O$: 2–9
$K_2O$: 2–12
$Li_2O$: 0–3
$Al_2O_3$: 0–7.

Canasite may be present as a second fluorosilicate phase but, for use in tableware application, having the crystal phase composed either substantially solely of potassium fluorrichterite or of potassium fluorrichterite with a minor amount of cristobalite is preferred.

Whereas the glazes of U.S. Pat. No. 3,384,508 can provide excellent gloss, exhibit very low release of heavy metals, e.g., lead and cadmium, and display good resistance to chemical attack by foods, detergents, etc., the glazes disclosed in that patent demonstrating the best performance require firing temperatures in the vicinity of 1050° C. The glass-ceramics of U.S. Pat. No. 4,467,039, however, are not as refractory as those of U.S. Pat. No. 3,201,266. Consequently, the glazes of U.S. Pat. No. 3,384,508 exhibiting the most desirable properties cannot be used with the glass-ceramics of U.S. Pat. No. 4,467,039, since the firing temperatures necessary for maturing those glazes cause thermal deformation and slumping of those glass-ceramics.

Therefore, the principal objective of the present invention was to develop glazes operable with the glass-ceramics of U.S. Pat. No. 4,467,039, while having properties rendering them particularly suitable for tableware applications.

SUMMARY OF THE INVENTION

We have found that glazes having compositions coming within the ranges reported below, expressed in terms of weight percent on the oxide basis, can satisfy the above objective. Hence, the inventive glazes can be fired to yield a smooth clear finish at temperatures below 1000° C. and consist essentially of:

$SiO_2$: 46–50
$Al_2O_3$: 5–8
$ZrO_2$: 0.3–1.0
$Li_2O$: 1–2
$Na_2O$: 2–3.5
$K_2O$: 1–2
$CaO$: 1–4
$ZnO$: 2–6
$SrO$: 2–6
$B_2O_3$: 9–11
$PbO$: 20–25.

Various compatible optional constituents may be included in the base composition, the total of such additions not exceeding about 5%. Illustrative of operable additions, in the indicated proportions, are 0–1% F, 0–1.1% $P_2O_5$, 0–2% $TiO_2$, 0–2% $SnO_2$, and 0–1% $MgO$. Because it is not known with which cations(s) the fluoride is combined and the amount present is so minor, it is merely recorded as fluoride in accordance with conventional glass analysis practice.

The Food and Drug Administration (FDA) has established maximum limits which lead release from an enameled surface must not exceed. In the prescribed test, an enameled surface is contacted for 24 hours with an aqueous 4% acetic acid solution at room temperature (22°±2° C.). A sample of the acetic acid solution is thereafter tested for absorbence in an atomic absorption spectroscope and the observed value converted to a metal concentration value on a standard curve, the lead being reported in parts per million (ppm). The reported value is based on the inside volume of a hollow article having an enameled or decorated surface and filled to a specified level with the acetic acid solution for the test. A similar test has been devised for use on exterior surfaces of a vessel or dish as well.

Compliance with FDA requirements limits lead release from a food contacting surface, i.e., the inside of a dish which actually contacts food during preparation, service, or storage, to 7 ppm. It is apparent that enamels (glazes) having lead release values below 7 ppm would be highly desirable. Accordingly, the present inventive glazes are designed to limit lead release values to not exceed about 1 ppm.

Whereas the FDA standards are founded upon acid reaction, it is well recognized that alkaline solutions frequently demonstrate even greater reaction with a glass surface. Accordingly, a test has been devised in which weighed samples of measured dimensions of glazed or enameled articles are immersed into a 0.3% by weight aqueous solution of an alkaline detergent operating at 95° C., the detergent being marketed by Economics Laboratories, St. Paul, Minn., under the trademark SUPER SOILAX. After 72 hours in the solution, the samples are removed, rinsed with tap water, dried, and weight loss determined. The loss may be based upon the glaze per se, or may be reported as lead release values for comparison with FDA standards. The period of 72 hours represents an accelerated equivalent to the anticipated exposure of a dish to such conditions during its expected lifetime. In like manner to the acid test described above, lead release values of the inventive glazes will not exceed about 1 ppm in this detergent test.

Finally, to confirm the exceptional chemical durability of the inventive glazes, the samples were "aged" in the above detergent solution and then subjected to the above acetic acid solution. Lead leached from the samples into the acidic solution is determined by chemical analysis and calculated on the basis of surface area of the sample. Yet again, the present inventive glazes will exhibit lead release values not exceeding about 1 ppm.

As has been pointed out previously, pigment materials are customarily included in decorative enamels to provide color and/or opacity. However, because the present invention is concerned with the glass component of an enamel, rather than the pigment, no further mention is made of pigments except to say that any of the known pigments may be employed in the usual manner and amount with the present glazes to produce the typical effects therein.

As is apparent from the ranges of components recited above, the inventive glazes comprise modifications of those disclosed in U.S. Pat. No. 3,384,508. The CaO content is held at a low level to prevent the formation of large diopside crystals at the interface between the glaze and the glass-ceramic body, the latter having a relatively high MgO content which leads to $Mg^{+2}$ ions entering the glaze and combining with CaO to form diopside. The presence of diopside crystals results in a reduction in chemical durability and increased lead release. $Li_2O$ is included to perform as a flux and the presence of SrO+ZnO improves the flow of the glaze during firing. The essential absence of MgO is preferred since it adversely affects the flow and appearance of the glaze and exacerbates the formation of diopside.

Finally, because the coefficients of thermal expansion (0°–300° C.) of the inventive glazes range between about $60-70 \times 10^{-7}/°$ C., surface compression is developed upon their application to the potassium fluorrichterite-containing glass-ceramics which have coefficients of thermal expansion in the region of about $80-130 \times 10^{-7}/°$ C.

PRIOR ART

Whereas the patent literature and scientific publications are replete with references to glazes of widely-varied compositions, U.S. Pat. No. 3,384,508 is believed to constitute the most pertinent disclosure to the present inventive materials. However, not only are $Li_2O$ and SrO nowhere mentioned in that text, but also there is no appreciation shown of the need to maintain the other components within the narrowly-defined limits of the inventive glazes.

U.S. Pat. No. 4,331,768 describes glazes exhibiting an earthenware appearance through the inclusion of $TiO_2$ and $SnO_2$ crystals in base compositions consisting essentially, in weight percent on the oxide basis, of:

$SiO_2$: 37–49
$Al_2O_3$: 4–7
$B_2O_3$: 6.5–11
$ZrO_2$: 0–1.75
$Na_2O$: 1.75–3.5
$K_2O$: 0.75–2.5
PbO: 21–32
CdO: 0–0.75
CaO: 1–9
$TiO_2$: 0–0.35
F: 0–0.6.

The preferred frits consisted essentially, in weight percent on the oxide basis, of:

$SiO_2$: 47–49
$Al_2O_3$: 4.5–5.5
$B_2O_3$: 6.5–7.5
$ZrO_2$: 0.75–1.75
$Na_2O$: 1.75–2.75
$K_2O$: 0.75–1.5
PbO: 27.5–29.5
CdO: 0.2–0.5
CaO: 5.75–7
$TiO_2$: 0.05–0.35
F: 0.2–0.6.

The working examples illustrated the optional presence of up to 1.2% $Li_2O$, up to 12% BaO, and up to 6% SrO.

ZnO is nowhere mentioned and, in the preferred compositions, the levels CaO and PbO are too high and the concentration of $B_2O_3$ too low. Moreover, the component ranges in the base compositions are much broader than the restricted limits of the inventive glazes, thereby evidencing the absence of any recognition of the superior properties inherent in the inventive glazes.

DESCRIPTION OF PREFERRED EMBODIMENTS

Table I records a number of frit compositions, expressed in terms of parts by weight on the oxide basis, illustrating the compositional parameters of the present invention. Inasmuch as the sum of the individual components totals or closely approximates 100, for all practical purposes the tabulated values may be deemed to reflect weight percent. Furthermore, because it is not known with which cation(s) the fluoride is combined, it is simply tabulated as fluoride, in accordance with customary glass analysis practice. The actual batch constituents may comprise any materials, either the oxides or other compounds, which, when melted together will be converted into the desired oxide in the proper proportions.

The batch ingredients were compounded, tumble mixed together to assist in securing a homogeneous melt, and charged into platinum crucibles. After placing a lid thereon, the crucibles were introduced into a furnace operating at about 1500° C. and the batches melted for about 4 hours. After hand drawing cane about 0.25" in diameter for use in physical property measurements, the melts were poured into water ("drigaged") or through water cooled rollers to form small particles of glass. Those particles were further comminuted by ball-milling such that the resulting frit would pass through a No. 325 U.S. Standard Sieve (44 microns). Table I also reports the softening point (S.P.) in ° C. and the coefficients of thermal expansion (Exp.) over the range 0°–300° C. in terms of $\times 10^7/°$ C. where determined, utilizing measuring techniques conventional in the glass art. Example 1 is a commercial glaze coming within the disclosure of U.S. Pat. No. 3,384,508.

TABLE I

| | 1 | 2 | 3 | 4 | 5 | 6 |
|---|---|---|---|---|---|---|
| $SiO_2$ | 47.7 | 49.1 | 49.3 | 49.6 | 48.6 | 48.2 |
| $Al_2O_3$ | 6.4 | 6.5 | 6.5 | 6.6 | 6.4 | 6.4 |
| $ZrO_2$ | 0.8 | 0.75 | 0.7 | 0.7 | 0.7 | 0.7 |
| $Li_2O$ | — | 1.3 | 1.3 | 1.3 | 1.3 | 1.3 |
| $Na_2O$ | 2.9 | 3.0 | 3.0 | 3.0 | 3.0 | 3.0 |
| $K_2O$ | 1.2 | 1.3 | 1.3 | 1.3 | 1.3 | 1.3 |
| MgO | — | — | 1.4 | 2.7 | — | — |
| CaO | 8.7 | 5.6 | 3.7 | 1.8 | 3.7 | 1.8 |
| ZnO | — | — | — | — | 2.8 | 5.4 |
| CdO | 0.3 | — | — | — | — | — |
| $B_2O_3$ | 10.0 | 10.0 | 10.1 | 10.1 | 9.9 | 9.8 |
| PbO | 21.6 | 22.0 | 22.1 | 22.2 | 21.8 | 21.6 |
| F | 0.4 | 0.5 | 0.5 | 0.5 | 0.5 | 0.5 |
| S.P. | 733 | 635 | — | — | — | — |
| Exp. | 62 | 63 | — | — | — | — |

| | 7 | 8 | 9 | 10 | 11 |
|---|---|---|---|---|---|
| $SiO_2$ | 48.3 | 47.5 | 48.5 | 47.8 | 47.9 |
| $Al_2O_3$ | 6.4 | 6.3 | 6.4 | 6.3 | 6.3 |
| $ZrO_2$ | 0.7 | 0.7 | 0.7 | 0.7 | 0.7 |
| $Li_2O$ | 1.3 | 1.3 | 1.3 | 1.3 | 1.3 |
| $Na_2O$ | 3.0 | 2.9 | 3.0 | 2.9 | 2.9 |
| $K_2O$ | 1.3 | 1.3 | 1.3 | 1.3 | 1.3 |
| MgO | — | — | 1.4 | — | — |
| CaO | 3.6 | 1.7 | 1.8 | — | 1.8 |
| SrO | 3.4 | 6.8 | 3.5 | — | 3.4 |
| ZnO | — | — | — | 8.1 | 2.8 |
| $B_2O_3$ | 9.8 | 9.7 | 9.9 | 9.7 | 9.8 |
| PbO | 21.7 | 21.3 | 21.8 | 21.4 | 21.5 |
| F | 0.5 | 0.5 | 0.5 | 0.5 | 0.5 |
| S.P. | — | — | — | — | 642 |
| Exp. | — | — | — | — | 64 |

The frit was blended into a commercial aqueous binder medium and the resulting fluid suspension sprayed onto glass-ceramic dinner plates containing potassium fluorrichterite as essentially the sole crystal phase and having the following approximate composition, expressed in terms of weight percent on the oxide basis:

$SiO_2$: 67.3
$Al_2O_3$: 1.7
MgO: 15.2
CaO: 3.9
$Li_2O$: 0.9
$Na_2O$: 2.2
$K_2O$: 4.9
F: 4.6.

The coated plates were fired for two hours at 980° C. and, after cooling, a visual inspection was made of each. Table II reports a visual description of that inspection. Except for Example 1 wherein the firing temperature was not sufficiently high to achieve satisfactory flow, the unsatisfactory surface appearance was the result of the growth of large crystals of diopside ($CaMgSi_2O_6$) at the glaze/glass-ceramic interface leading to a matte-appearing texture. In the worst instances those crystals had actually grown through the glaze.

TABLE II

| Example | Time | Temp. | Appearance |
|---|---|---|---|
| 1 | Did not flow | | |
| 2 | 2 hrs. | 980° C. | Poor |
| 3 | " | " | Poor |
| 4 | " | " | Poor |
| 5 | " | " | Poor |
| 6 | " | " | Fair |
| 7 | " | " | Fair |
| 8 | " | " | Fair |
| 9 | " | " | Fair |
| 10 | " | " | Fair |
| 11 | " | " | Good |

Example 11 was subjected to the two-step alkaline-acidic bleaching test described above. Lead release was measured at less than 0.8 ppm.

We claim:

1. A glaze composition exhibiting a coefficient of thermal expansion (0°-300° C.) of about $60-70 \times 10^{-7}/°$ C., a lead release after alkaline-acidic attack not exceeding about 1 ppm, and a smooth clear finish which consists essentially, expressed in terms of weight percent on the oxide basis, of
   $SiO_2$: 46-50
   $Al_2O_3$: 5-8
   $ZrO_2$: 0.3-1
   $Li_2O$: 1-2
   $Na_2O$: 2-3.5
   $K_2O$: 1-2
   $CaO$: 1-4
   $ZnO$: 2-6
   $SrO$: 2-6
   $B_2O_3$: 9-11
   $PbO$: 20-25.

2. A glaze composition according to claim 1 also containing up to 5% total of at least one constituent selected from the group in the indicated proportions of 0-0.1% $P_2O_5$, 0-2% $TiO_2$, 0-2% $SnO_2$, 0-1% MgO, and 0-1% F.

3. A composite article consisting of a glass-ceramic body containing potassium fluorrichterite as substantially the sole crystal phase and an adherent glaze exhibiting a coefficient of thermal expansion (0°-300° C.) of about $60-70 \times 10^{-7}/°$ C., a lead release after alkaline-acidic attack not exceeding about 1 ppm, and a smooth clear finish, said glaze consisting essentially, expressed in terms of weight percent on the oxide basis, of
   $SiO_2$: 46-50
   $Al_2O_3$: 5-8
   $ZrO_2$: 0.3-1
   $Li_2O$: 1-2
   $Na_2O$: 2-3.5
   $K_2O$: 1-2
   $CaO$: 1-4
   $ZnO$: 2-6
   $SrO$: 2-6
   $B_2O_3$: 9-11
   $PbO$: 20-25.

4. A composite article according to claim 3 also containing up to 5% total of at least one constituent selected from the group in the indicated proportions of 0-0.1% $P_2O_5$, 0-2% $TiO_2$, 0-2% $SnO_2$, 0-1% MgO, and 0-1% F.

* * * * *